United States Patent
Toyama et al.

(10) Patent No.: US 9,122,831 B2
(45) Date of Patent: Sep. 1, 2015

(54) LSI DESIGNING APPARATUS, LSI DESIGNING METHOD, AND PROGRAM

(71) Applicant: Mitsubishi Electric Corporation, Chiyoda-ku (JP)

(72) Inventors: Osamu Toyama, Chiyoda-ku (JP); Yoshihiro Ogawa, Chiyoda-ku (JP); Noriyuki Minegishi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/380,447

(22) PCT Filed: May 20, 2013

(86) PCT No.: PCT/JP2013/063914
§ 371 (c)(1),
(2) Date: Aug. 22, 2014

(87) PCT Pub. No.: WO2013/176077
PCT Pub. Date: Nov. 28, 2013

(65) Prior Publication Data
US 2015/0033200 A1    Jan. 29, 2015

(30) Foreign Application Priority Data
May 21, 2012    (JP) .................... 2012-115508

(51) Int. Cl.
*G06F 17/50*    (2006.01)
(52) U.S. Cl.
CPC .......... *G06F 17/5077* (2013.01); *G06F 17/505* (2013.01); *G06F 2217/66* (2013.01)

(58) Field of Classification Search
CPC ............ G06F 17/5045; G06F 17/5077; G06F 17/505; G06F 2217/66
See application file for complete search history.

(56) References Cited

U.S. PATENT DOCUMENTS 6,687,894 B2    2/2004  Ohnishi et al.
6,961,913 B1    11/2005 Okazaki et al.
6,993,740 B1 *  1/2006  Bergamaschi et al. .. 324/762.06

(Continued)

FOREIGN PATENT DOCUMENTS

JP    2001 142932    5/2001
JP    2002 140379    5/2002

(Continued)

OTHER PUBLICATIONS

International Search Report Issued Jul. 2, 2013 in PCT/JP13/063914 Filed May 20, 2013.

(Continued)

*Primary Examiner* — Nha Nguyen
(74) *Attorney, Agent, or Firm* — Oblon, McClelland, Maier & Neustadt, L.L.P.

(57) ABSTRACT

An apparatus and method that improve design efficiency when designing an LSI. A selector module generating section inputs IP connection information describing input/output flows of signals between IPs included in an LSI to be designed, analyzes the inputted IP connection information, and generates a selector module of a selector that matches the input/output flows of signals between IPs described in the IP connection information. A macro module generating section generates a macro module in which relationships between the selector and function blocks are indicated, using the selector module generated by the selector module generating section.

6 Claims, 11 Drawing Sheets

(56) References Cited

U.S. PATENT DOCUMENTS

| | | | |
|---|---|---|---|
| 8,413,106 B1* | 4/2013 | Goossens | 717/104 |
| 2004/0015788 A1* | 1/2004 | Huang et al. | 716/1 |
| 2004/0139409 A1* | 7/2004 | Nagasawa et al. | 716/5 |
| 2006/0036974 A1 | 2/2006 | Okazaki et al. | |
| 2008/0091989 A1* | 4/2008 | Bakhshi et al. | 714/718 |

FOREIGN PATENT DOCUMENTS

| | | |
|---|---|---|
| JP | 2002-342259 | 11/2002 |
| JP | 2004 213301 | 7/2004 |
| JP | 2006 4313 | 1/2006 |
| JP | 2006 65457 | 3/2006 |
| JP | 2006 244274 | 9/2006 |
| JP | 2007 193842 | 8/2007 |
| JP | 2011-243055 | 12/2011 |

OTHER PUBLICATIONS

Japanese Office Action issued Dec. 2, 2014, in Japan Patent Application No. 2014-516788 (with English Abstract).

* cited by examiner

Fig.3

A_out. PXR => C_in. PXR
A_out. PXG => C_in. PXG
A_out. PXB => C_in. PXB
A_out. PXVS => C_in. PXVS
A_out. PXHS => C_in. PXHS
A_out. PXVE => C_in. PXVE
A_out. PXHE => C_in. PXHE B_out. PXR => C_in. PXR
B_out. PXG => C_in. PXG
B_out. PXB => C_in. PXB
B_out. PXVS => C_in. PXVS
B_out. PXHS => C_in. PXHS
B_out. PXVE => C_in. PXVE
B_out. PXHE => C_in. PXHE

041 : IP CONNECTION INFO

LSI DESIGNING APPARATUS, LSI DESIGNING METHOD, AND PROGRAM

TECHNICAL FIELD

The present invention relates to the designing of an LSI (Large Scale Integrated Circuit).

BACKGROUND ART

As the LSI becomes large in scale, so-called IP (Intellectual Property) based designing methods have been proposed.

In the IP based design, a plurality of existing function blocks, such as IPs or previously operated circuit modules, are utilized and combined to set up a system LSI, thereby improving development efficiency.

Further, the IP based design basically utilizes IPs or existing modules, and only requires a modification to a peripheral circuit or a change in wire connections among function blocks to set up a system LSI, thereby improving design efficiency significantly.

CITATION LIST

Patent Literature

Patent Document 1: JP 2006-244274 A
Patent Document 2: JP 2007-193842 A

SUMMARY OF INVENTION

Technical Problem

However, as the LSI becomes larger in scale, and functions required for the system LSI become more diversified, the number of IPs needed to set up the system LSI is increased, and connection relationships among IPs become more complicated.

Hence, the increase in the modification of peripheral circuits, the increase in the amount of change in wire connections among function blocks, and the increase in the amount of man hours for glue logic design needed to achieve the connection relationships, are impediments to improving design efficiency.

Here, it is assumed for example that a system LSI is designed for video signal processing.

If there is demand for a one-chip LSI handling the inputs/outputs to two systems that use multiple degrees of resolution and different image formats from each other, demanded functions can be satisfied by providing the systems with absolutely the same video signal processing function, and configuring the LSI so that the two systems run independently.

Such an implementation, however, ends in a large-scale circuit, and therefore is not practical.

In practice, a use case of the LSI is defined as a restriction and an operation mode.

If there are a plurality of functions that fail to run simultaneously in a certain mode, the functions are merged and optimized to be achieved with a minimum necessary number of IPs.

In the optimization to achieve the functions with the minimum necessary number of IPs, IPs are to be designed so that the same IP can receive different input data according to the operation mode, in order to merge the functions.

This requires a selector (glue logic) to control input data.

The required selector is different according to the system to be implemented, and therefore cannot be incorporated as a standard function of an IP.

Thus, a selector needs to be redesigned whenever a system is built.

The redesigned selector also needs to be controlled within the system.

Usually, the system is controlled by a CPU (Central Processing Unit), and therefore a CPU bus IF (interface) for accessing a register for controlling the selector also needs to be changed in design according to the system.

Simply inserting the selector thus requires some design changes. If there are more insertions, design efficiency will deteriorate.

In view of the issues discussed above, a main objective of the present invention is to improve design efficiency when designing an LSI.

Solution to Problem

An LSI (Large Scale Integrated Circuit) designing apparatus according to the present invention includes:

a selector module generating section that inputs input/output flow information describing input/output flows of signals between function blocks included in an LSI to be designed; analyzes the inputted input/output flow information; and generates a selector module of a selector that matches the input/output flows of signals between function blocks described in the input/output flow information; and a macro module generating section that generates a macro module in which relationships between the selector and function blocks are indicated, using the selector module generated by the selector module generating section.

Advantageous Effects of Invention

According to the present invention, input/output flow information is analyzed, and a selector module of a selector that matches input/output flows of signals between function blocks described in the input/output flow information, a macro block including the selector module, and a CPU bus IF for controlling the selector module are generated automatically. This helps improve design efficiency when designing an LSI.

BRIEF DESCRIPTION OF DRAWINGS

FIG. 3 shows an example of IP connection information according to the first embodiment.

DESCRIPTION OF EMBODIMENTS

Embodiment 1

The present embodiment describes a system LSI designing platform for setting up a system LSI, by interconnecting a plurality of function blocks including IPs.

The system LSI designing platform according to this embodiment includes a selector module generating section, a macro module generation section, and an LSI top connection description generating section.

The selector module generating section generates a selector module needed to establish connection relationships between the plurality of function blocks including IPs.

The macro module generating section generates a macro module including the selector module generated by the selector module generating section and an IP to which the selector module is to be connected.

The LSI top connection description generating section connects the macro module generated by the macro module generating section to an IP, and generates an LSI top description.

The use of the system LSI designing platform according to this embodiment automates the design of a new selector and the design change of the CPU bus IF which are required whenever a system LSI is designed, thereby improving design efficiency.

Figure 1:
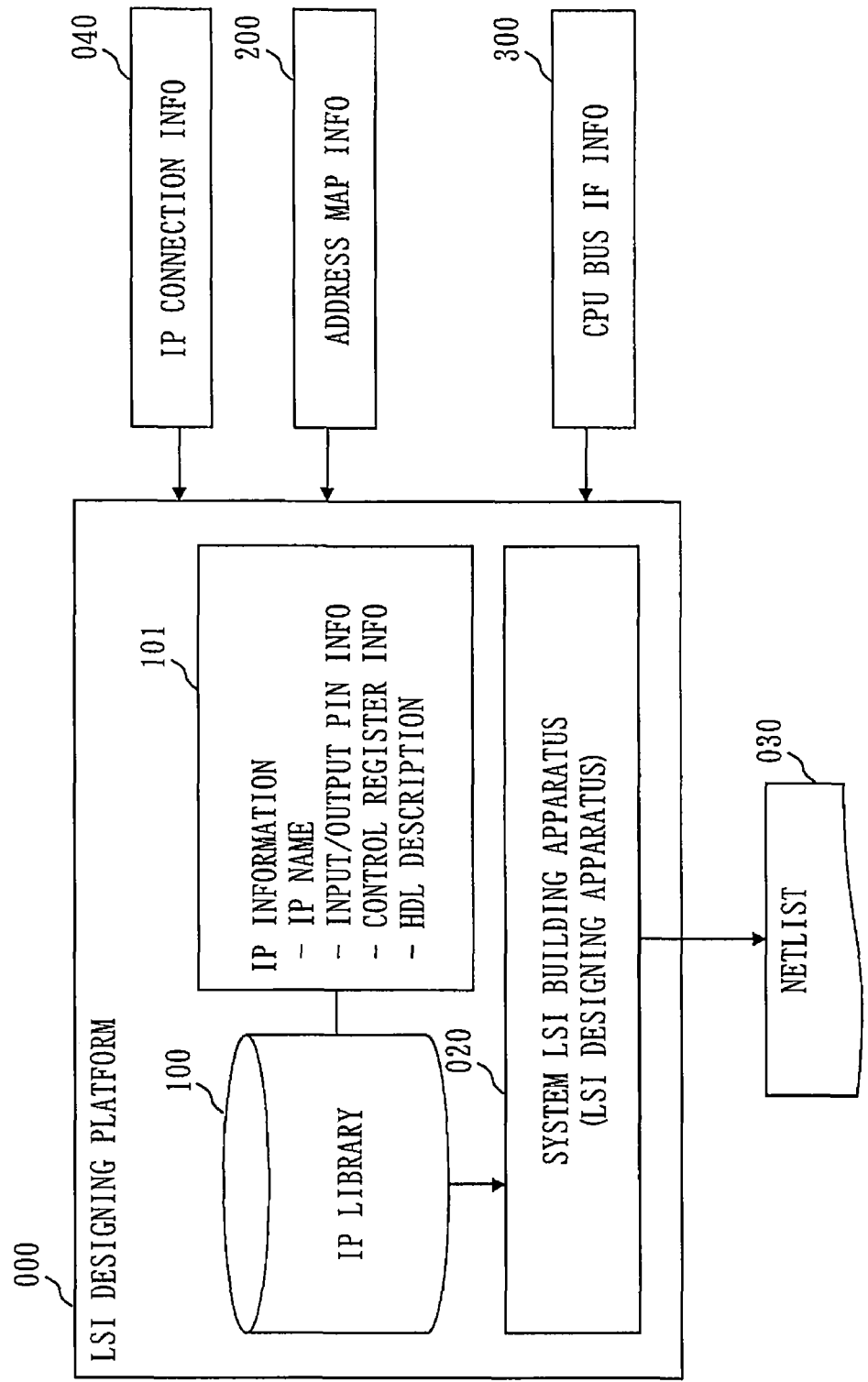
FIG. 1 shows an example of the configuration of an LSI designing platform according to a first embodiment.

FIG. 1 is a block diagram showing an example of the configuration of the system LSI designing platform according to this embodiment.

An LSI designing platform 000 includes an IP library 100 and a system LSI building apparatus 020.

The system LSI building apparatus 020 inputs IP connection information 040, address map information 200 and CPU bus IF information 300, and outputs a netlist 030.

The netlist 030 is a system LSI top connection description described in HDL (Hardware Description Language).

The IP connection information 040, the address map information 200 and the CPU bus IF information 300 will be described later in detail.

The IP library 100 includes IP information 101 of each IP contained in the library. The IP information 101 includes an IP name, input/output pin information, control register information, and an HDL description, for example.

The IP library 100 includes the IP information 101 of IPs contained in a system LSI to be designed.

The system LSI building apparatus 020 corresponds to an example of an LSI designing apparatus.

The system LSI building apparatus 020 is described with reference to FIG. 2 in detail.

The system LSI building apparatus 020 includes a selector module generating section 021, a macro module generating section 022 and an LSI top connection description generating section 023.

The selector module generating section 021 inputs the IP connection information 040, and generates a selector library 011.

The selector library 011 stores information on selector modules to be generated by the selector module generating section 021.

The selector library 011, like the IP library 010, includes IP names (selector names), input/output pin information, control register information, and HDL descriptions, for example.

Figure 5:
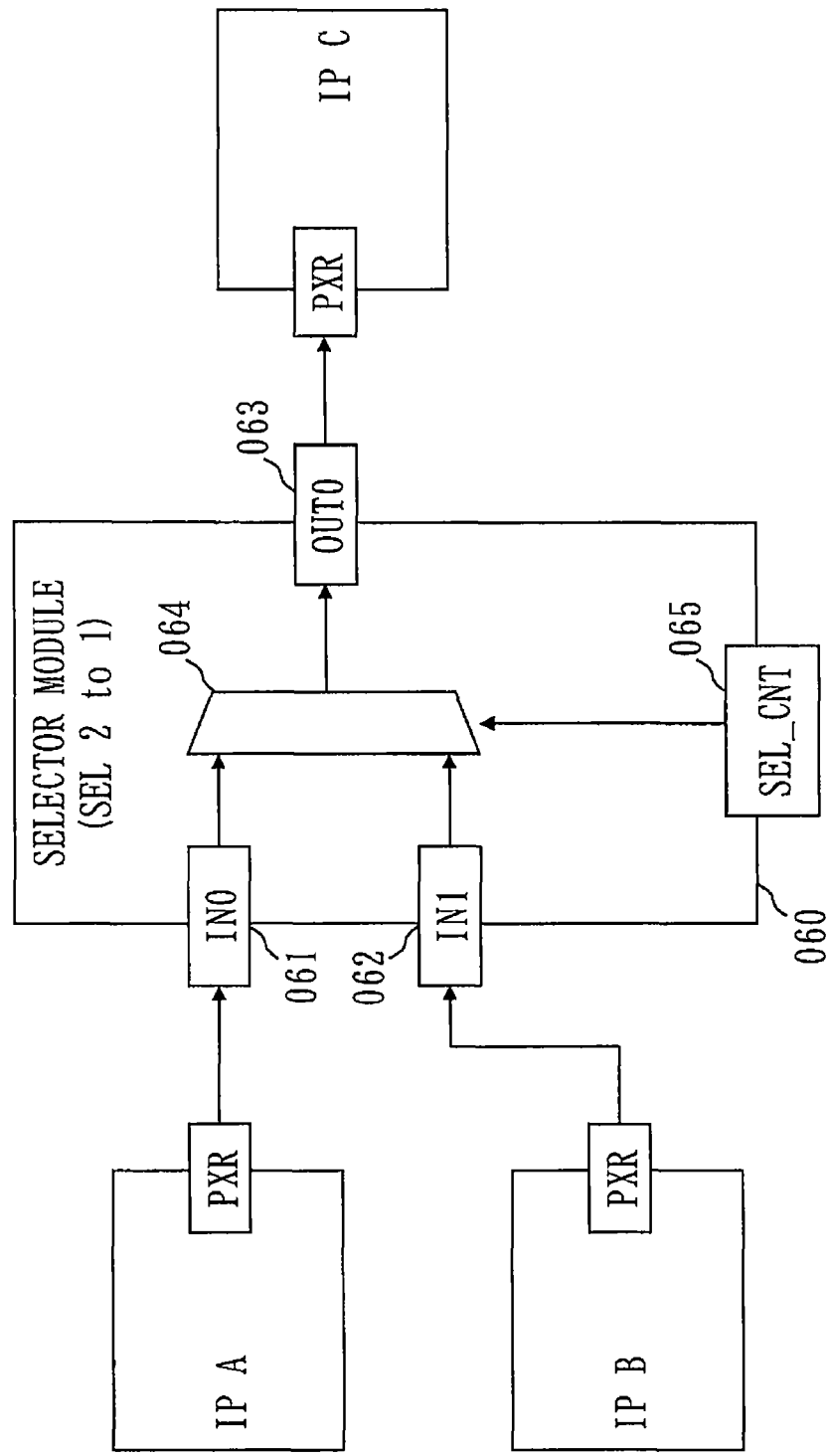
FIG. 5 shows an example of a selector module according to the first embodiment.

The selector module, as shown in FIG. 5 which will be described later, is a function block 060 in which a selector 064, input pins 061 and 062, an output pin 063, and a selector control single input interface 065 are correlated.

The input pins 061 and 062 are provided for the selector 064 to input a signal from an IP.

The output pin 063 is provided for the selector 064 to output a signal to an IP.

The selector control signal input interface 065 is provided for inputting a control signal.

The term "to generate a selector module" means to generate a template of the selector module 060 like the one shown in FIG. 5.

Detailed information on the template is information in the selector library 011 (IP names (selector names), input/output pin information, control register information, and HDL descriptions).

The selector module generating section 021 generates the template of the selector module of a 2 to 1 selector like the one shown in FIG. 5, when the 2 to 1 selector is required, for example.

When a 3 to 1 selector is required, the selector module generating section 021 generates the template of the selector module of a 3 to 1 selector corresponding to the configuration shown in FIG. 5.

The selector module generating section 021 registers detailed information on the generated template, in the selector library 011.

Then, the macro module generating section 022, described later, generates the instance of the selector module of the 2 to 1 selector, or the instance of the selector module of the 3 to 1 selector, for example, based on information in the selector library 011.

The IP connection information 040 indicates connection relationships between IPs (except CPU bus IFs) in a specific format, as shown in an IP connection information example 041 in FIG. 3, for example.

The IP connection information example 041 in FIG. 3 indicates connection relationships among three IPs, A, B and C.

Referring to the IP connection information example 041, A_out, B_out and C_in are key words indicating an output signal from the IP A, an output signal from the IP B, and an input signal to the IP C, respectively.

What follows "." shows the name of the signal line of the IP, that is, A_out.PXR indicating a PXR signal (output) of the IP A.

A sign "=>" indicates a forward direction of the signal line, that is, A_out.PXR=>C_in.PXR indicating that the PXR signal (output) of the IP A is connected to the PXR signal (input) of the IP C.

Figure 4:
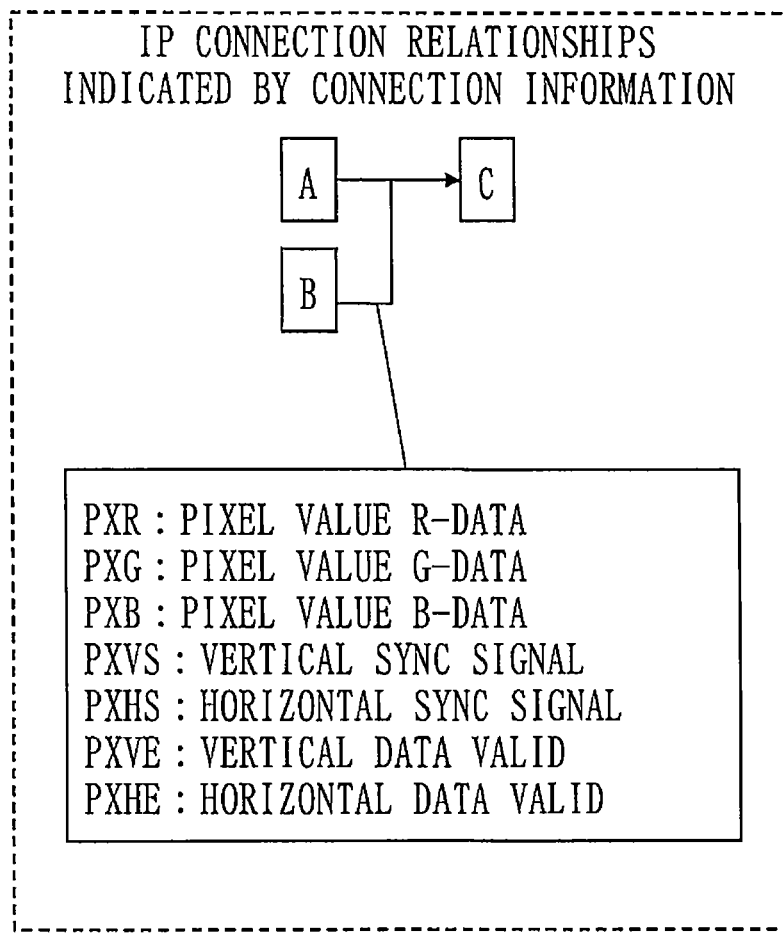
FIG. 4 shows an example of IP connection information according to the first embodiment.

FIG. 4 shows the connection relationships described in the IP connection information example 041, and the meaning of each of the signal lines.

The format shown in FIG. 3 using the signs A_out, C_in, ".", and "=>" to describe the connection relationships is used just for a simple and concise explanation. This format does not limit the description format of the IP connection information 040.

As shown in FIG. 3, the IP connection information 040 is the information describing the input/output flows of signals between function blocks included in an LSI to be designed, which corresponds to an example of input/output flow information.

The selector module generating section 021 scans the IP connection information 040, and examines the necessity of the insertion of a selector for each input signal.

When a selector is to be inserted, the selector module generating section 021 generates the selector module.

The necessity of the insertion of a selector is determined by examining if a plurality of output signals are connected to a single input signal.

Referring to the IP connection information example 041 (FIG. 3), for example, the output signals A_out.PXR and B_out.PXR are connected to the input signal C_in.PXR.

This shows that a 2 to 1 selector needs to be inserted before the input of the input signal C_in.PXR.

Consequently, the selector module generating section 021 generates the selector module of the 2 to 1 selector.

Thus, the selector module generating section 021 analyzes the IP connection information 040, and generates the selector module of a selector that matches the input/output flows of signals between the IPs described in the IP connection information 040.

FIG. 5 shows an example of the selector module 060 generated by the selector module generating section 021.

The selector module 060 includes the input pins 061 and 062, the output pin 063, and the selector control signal interface 065.

The input pins 061 and 062 are provided for the 2 to 1 selector 064 to input signals from the IPs A and B.

The output pin 063 is provided for the 2 to 1 selector 064 to output a signal to the IP C.

The selector control signal input interface 065 is provided for controlling the 2 to 1 selector 064.

The foregoing is a description of the selector being a 2 to 1 selector. In the case of an N to M selector (N and M are integers, and NM) required, a selector having a similar configuration is generated.

Specifically, the selector module generating section 021 analyzes the IP connection information 040, and correlates two or more IPs that input/output signals of the same type (PXR signal, PXG signal, etc.).

Then, the selector module generating section 021 generates the selector module of an N to M selector that has an input pin for each of (N) correlated IPs outputting signals, and an output pin for each of (M) correlated IPs inputting signals.

The foregoing generations are repeated until all the necessary selector modules are generated, and then information on the generated selector modules is outputted as the selector library 011.

However, if there is a selector module having the same function, e.g., a 2 to 1 selector, already contained in the selector library 011, a duplicate generation is avoided.

The macro module generating section 022 inputs the IP information 101 in the IP library 100, the CPU bus IF information 300, the selector library 011 outputted by the selector module generating section 021, and the IP connection information 040, and generates the macro module.

Then, the macro module generating section 022 outputs the generated macro module as the macro library 012.

The macro module to be generated here is a wrapper module including the selector module generated by the selector module generating section 021 and an IP to which the output of the selector module is to be connected.

The macro library 012 contains macro names, input/output pin information, control register information, HDL descriptions, and information on contained IPs, for example.

Figure 6:
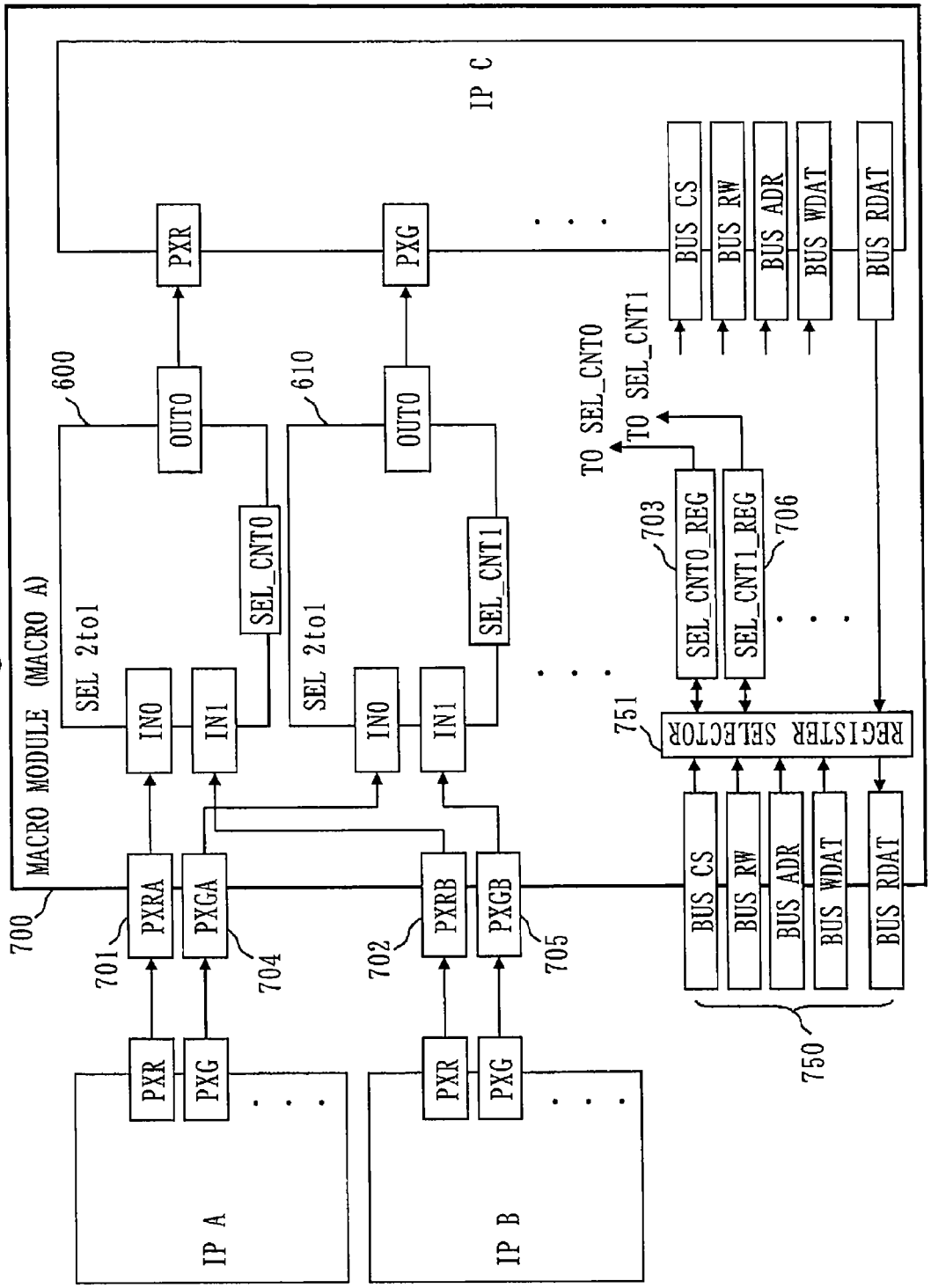
FIG. 6 shows an example of a macro module according to the first embodiment.

FIG. 6 shows a macro module 700 to be generated based on the IP connection information 041 shown in FIG. 3.

The macro module generating section 022 scans the IP connection information 040 (041), and examines the input signal of an IP to which a selector is to be inserted.

If there is an input signal for which the insertion of a selector is required, the macro module generating section 022 selects a selector module having a function needed to establish the connection relationships, from the selector library 011.

In this specific example, the macro module generating section 022 selects the 2 to 1 selector module 060 (FIG. 5).

Then, the macro module generating section 022 connects the selector module 600 as the instance of the selector module 060 to the IP C, in the macro module 700.

More specifically, the macro module generating section 022 generates input ports 701 and 702 of a new macro module which are connected to the inputs of the selector, and at the same time generates a control register 703 for the selector.

Also, the macro module generating section 022 adds a register selector 751 to the control register 703 based on the CPU bus IF information 300 so that a read/write operation can be performed via a CPU bus IF 750.

Further, the macro module generating section 022 reads control register information for the IP C included in the macro module, from the IP library 100.

The macro module generating section 022 adds information on the control register 703 to the readout control register information for the IP C, and generates the control register information for the macro module.

The CPU bus IF information 300 is the information in which the name of the signal of a CPU bus IF and the meaning thereof are correlated.

Referring to FIG. 6, the CPU bus IF information 300 is the information in which a chip select signal (BUS CS), a read/write control signal (BUS RW), an address signal (BUS ADR), a write data signal (BUS WDAT), and a read data signal (BUS RDAT) are correlated with actual CPU bus IFs, respectively.

The control register information is the information in which a control register included in an IP is correlated with a bus address, in a specific format.

Figure 7:
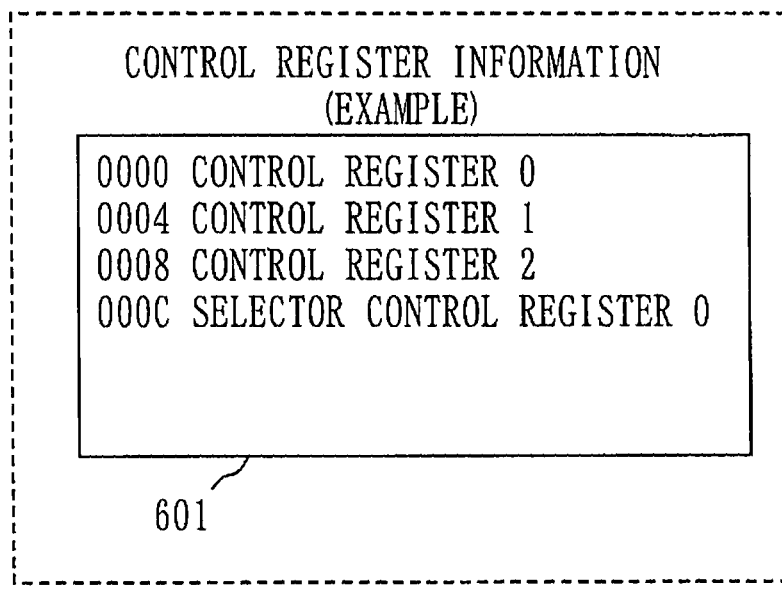
FIG. 7 shows an example of control register information according to the first embodiment.

For example, the control register information is the information in which an address (0000, etc.) is correlated with the name of a control register (control register 0, etc.), in a format with a space provided in between, as shown by a reference sign 601 in FIG. 7.

Referring to FIG. 7, the first line indicates that when the bus IF chip select (signal BUS CS, in FIG. 6) is effective, the control register 0 in the IP can be accessed, by inputting the bus address (BUS ADR, in FIG. 6) 0000h.

Descriptions are similar in the second and subsequent lines.

Figure 8:
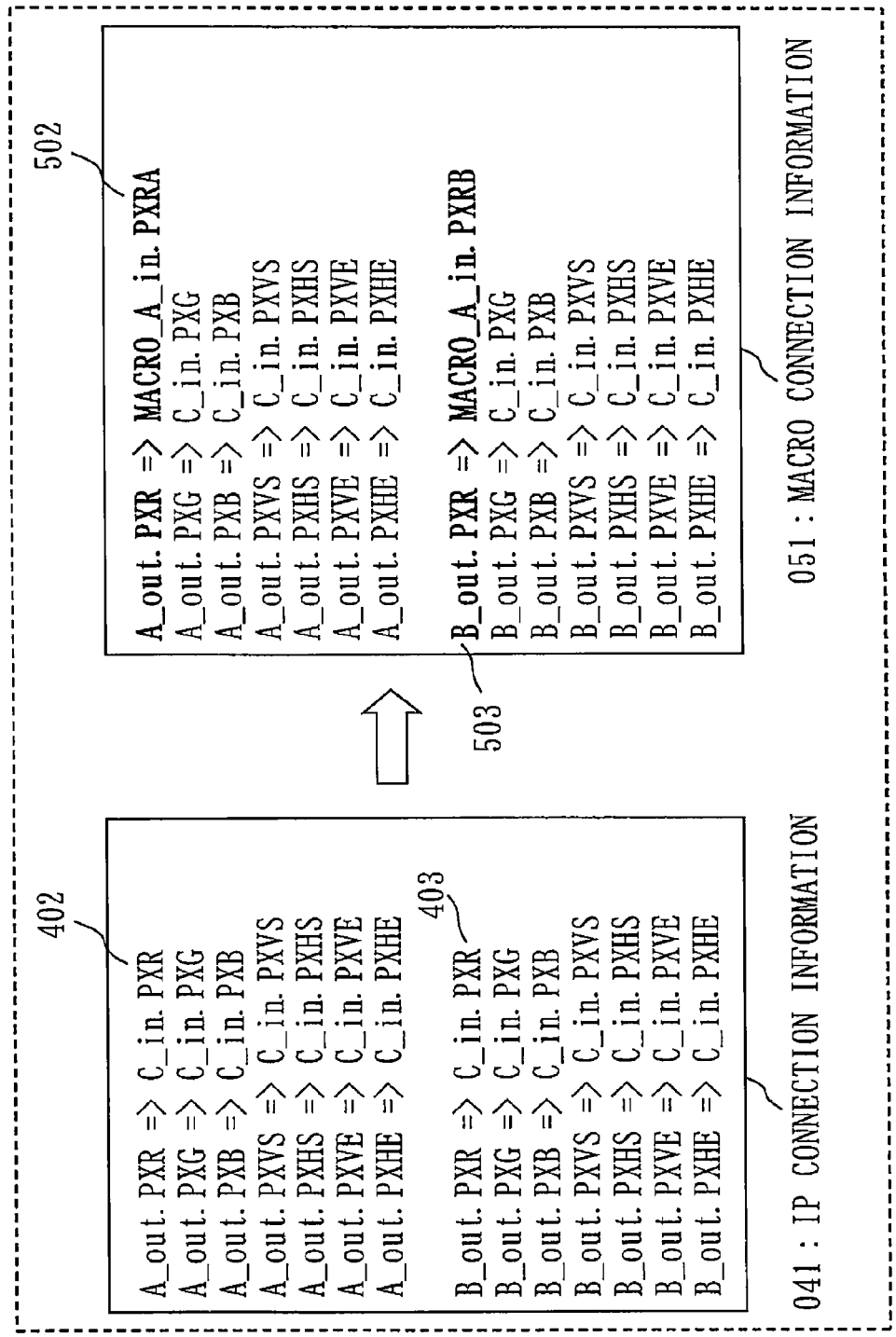
FIG. 8 shows an example of the generation of macro connection information according to the first embodiment.

The macro module generating section 022 rewrites a portion of the IP connection information 040 (041) corresponding to a portion to which an IP is connected in the macro module to indicate the connection to the macro module, and generates macro connection information 050 (051) (FIG. 8).

Referring to the example of FIG. 8, when connecting the selector module to the IP, for the signal PXR, a reference sign 402 line in the IP connection information 041 is rewritten as shown by a reference sign 502 line.

Likewise, a reference sign 403 line is rewritten as shown by a reference sign 503 line.

That is how the macro connection information 051 is generated.

Likewise, for other signals, when connecting the selector module to an IP, a corresponding line in the IP confection information 041 is rewritten in the format shown in FIG. 8.

According to the IP connection information 041 in FIG. 3, a 2 to 1 selector also needs to be inserted for other types of signals, PXG, PXB, etc.

Accordingly, the macro module generating section 022 generates the instance of the 2 to 1 selector module (FIG. 5) for each signal.

Then, the macro module generating section 022 connects each of the selector modules to the IP C, in the macro module 700.

Further, the macro module generating section 022 generates the input port of the macro module for each signal, and rewrites the IP connection information 040.

The macro module generating section 022 repeats the foregoing operations until the macro module generation is no more needed, generates all the macro modules, and outputs the macro library 012.

FIG. 6 shows the selector module 600, the input ports 701 and 702, and the control register 703, for the signal PXR; and a selector module 610, input ports 704 and 705, and a control register 706, for the signal PXG, exclusively.

In practice, a similar configuration is generated for each of the signals shown in the IP connection information 041 in FIG. 3.

The format of the control register information shown in FIG. 7 is used just for a simple and concise explanation, and does not limit the description format of the control register information.

Subsequently, the LSI top connection description generating section 023 inputs the macro library 012 generated by the macro module generating section 022, the macro connection information 050 and the address map information 200, and finally generates the netlist 030.

The address map information 200 is a file described in a specific format.

The address map information 200 indicates a system address to which the tip of the control register of an IP is to be mapped.

Figure 9:
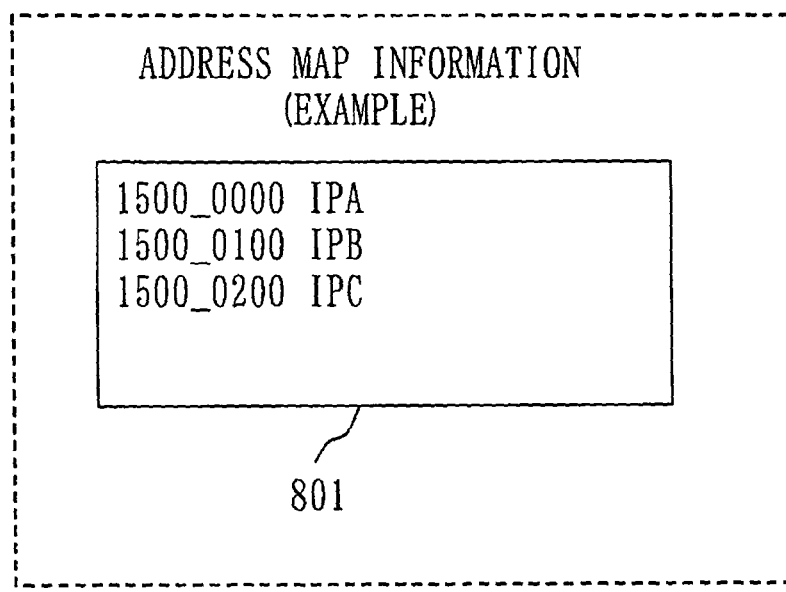
FIG. 9 shows an example of address map information according to the first embodiment.

In the address map information 200, system addresses and IP names are described in pairs as shown by a reference sign 801 in FIG. 9, for example.

The example of the reference sign 801 in FIG. 9 shows that:

the control register of the IP A is to be mapped to a system address after 1500_0000h;

likewise, the control register of the IP B is to be mapped to a system address after 1500_0100h; and further, the control register of the IP C is to be mapped to a system address after 1500_0200.

In FIG. 9, addresses and IP names are described line by line in pairs with a space in between. This format is just an example used for a simple and concise explanation, and does not limit the description format.

The LSI top connection description generating section 023 generates the connection description between the IP and the macro module, according to the macro connection information 050.

Figure 10:
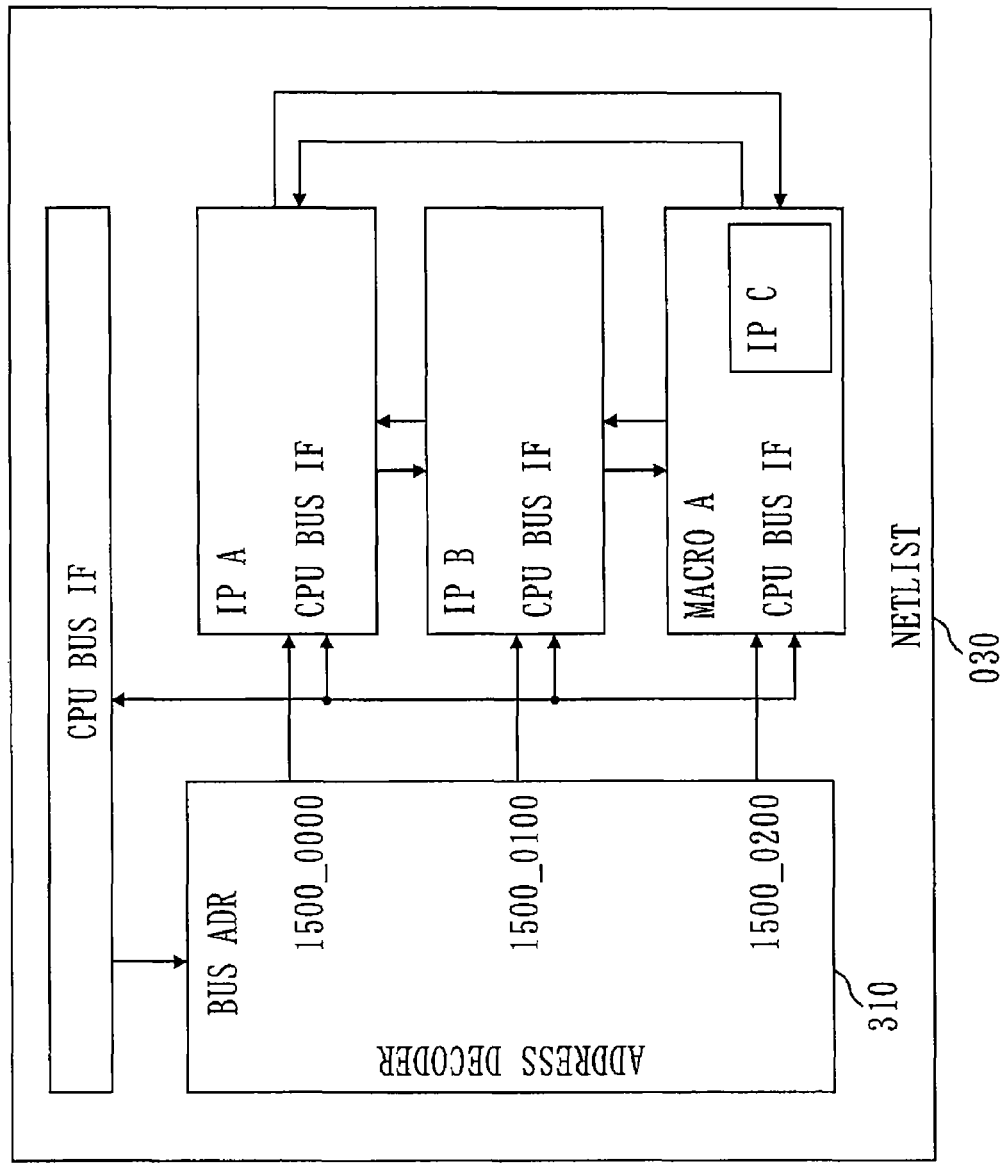
FIG. 10 shows an example of a netlist according to the first embodiment.

Then, the LSI top connection description generating section 023 generates the address decoder 310 (FIG. 10) for outputting the chip select signal (signal BUS CS, in FIG. 6) among the CPU bus IFs, according to the address map information 200.

The LSI top connection description generating section 023 connects the chip select signal of the generated address decoder 310 to the chip select signal of an IP described in the address map information 200.

However, the IP names of IPs contained in the macro module do not exist in the macro connection information 050.

In such a situation, the LSI top connection description generating section 023 searches IP information contained in the macro library 012, and connects the chip select signal of the address decoder 310 to a chip select input of the macro module including the IP.

Lastly, the LSI top connection description generating section 023 interconnects CPU bus IFs, based on the CPU bus IF information 300.

According to the foregoing configuration, only by generating the IP connection information and the address map information, when setting up the system LSI in line with the IP based design, the glue logic needed to interconnect IPs, and the CPU bus IF needed to control each of the IPs by the CPU, are automatically generated.

The LSI top connection description can be obtained by using the automatically generated CPU bus IF, thereby improving design efficiency in the IP based design.

This embodiment describes the system LSI designing platform for setting up a system LSI, by interconnecting a plurality of function blocks including IPs (Intellectual Properties).

More specifically, this embodiment describes the system LSI designing platform which includes:

the selector module generating section that generates the selector module needed to establish the connection relationships between the plurality of function blocks including IPs;

the macro module generating section that generates the macro module including the selector module generated by the selector module generating section and the IP to which the selector module is to be connected; and the LSI top connection description generating section that connects the macro module generated by the macro module to the IP, and generates the top description of the LSI.

Further, this embodiment describes that the macro module generating section generates the macro module containing the selector module generated by the selector module generating section, and the IP to which the output of the selector module is to be connected, based on the IP connection information indicating the connection relationships between the function blocks including IPs.

Further, this embodiment describes that the macro module generating section generates the CPU bus IF for accessing the selector module generated by the selector module generating section, and the control register contained in the IP, in the IF of the macro module, based on the CPU bus IF information.

Further, this embodiment describes that the LSI top connection description generating section generates the address decoder needed to access the IP and the control register in the macro module generated by the macro module generating section, from the CPU bus IF, based on the address map information, and connects the address decoder to the IP and the CPU bus IF of the macro module.

Finally, an example of the hardware configuration of the system LSI building apparatus 020 according to this embodiment is described with reference to FIG. 11.

The system LSI building apparatus 020 is a computer. The elements of the system LSI building apparatus 020 can be implemented by programs.

In the hardware configuration of the system LSI building apparatus 020, an arithmetic unit 901, an external storage unit 902, a main storage unit 903, a communication unit 904, and an input/output unit 905 are connected to a bus.

The arithmetic unit 901 is a CPU for executing programs.

The external storage unit 902 is a ROM (Read Only Memory), a flash memory, or a hard disk drive, for example.

The main storage unit 903 is a RAM (Random Access Memory).

The communication unit 904 is a communication card, for example.

The input/output unit 905 is a mouse, a keyboard, a display unit, etc., for example.

The input/output unit 905 inputs the IP connection information 040, the address map information 200, and the CPU bus IF information 300, and displays the netlist 030, for example.

Programs are usually stored in the external storage unit 902, and sequentially read and executed by the arithmetic unit 901 after loaded in the main storage unit 903b.

Figure 2:
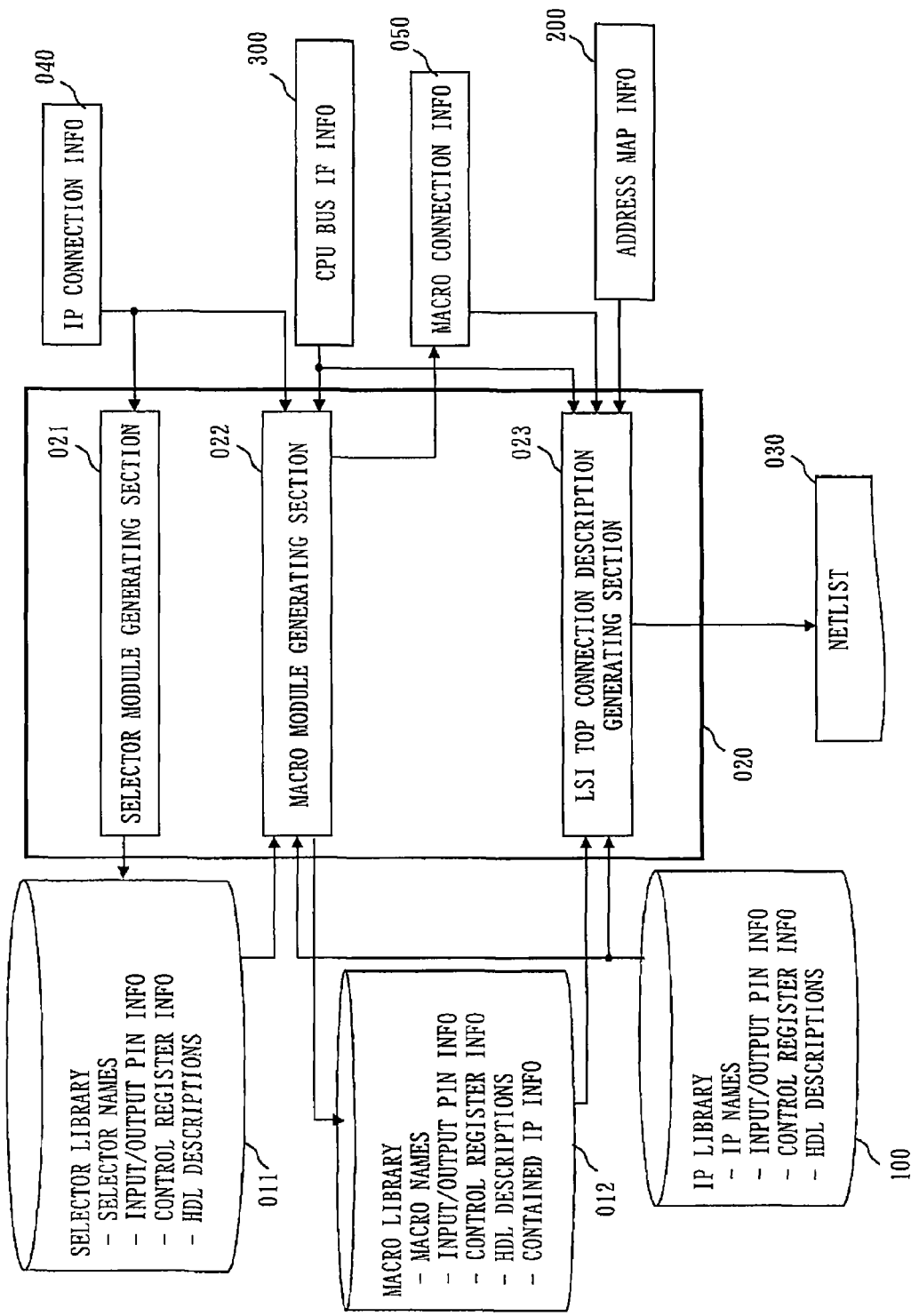
FIG. 2 shows an example of the configuration of a system LSI building apparatus according to the first embodiment.

The programs are provided for implementing functions described as "sections" in FIG. 2.

Further, the external storage unit 902 also stores the operating system (OS). At least part of the OS is loaded into the main storage unit 903. The arithmetic unit 901 executes programs for implementing the functions of the "sections" shown in FIG. 2, while executing the OS.

The IP connection information 040, the address map information 200, the CPU bus IF information 300 which are inputted, are also sequentially loaded into the main storage unit 903, and used by the arithmetic unit 901.

Information in the generated selector library 011 and information in the generated macro library 012 are also stored in the main storage unit 903, and used by the arithmetic unit 901.

The main storage unit 903 also stores as files, information, data, signal values, and variable values, which indicate the results of processes described as "determination", "judgment", "extraction", "analysis", "generation", "detection", "setting", "registration", "selection", "inputting", "outputting", etc. in this embodiment.

Crypt/decrypt keys, random values, or parameters may also be stored as files in the main storage unit 903.

Figure 11:
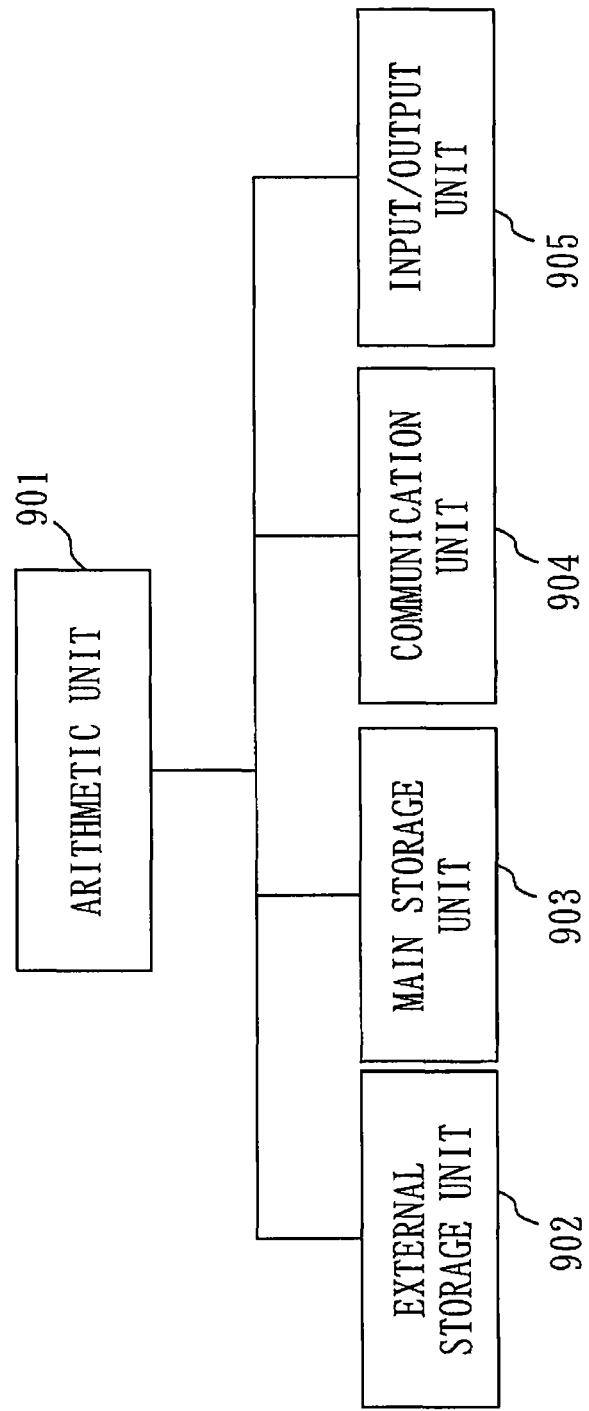
FIG. 11 shows an example of the hardware configuration of the system LSI building apparatus according to the first embodiment.

Referring to FIG. 11, the configuration is just an example of the hardware configuration of the system LSI building apparatus 020. The system LSI building apparatus 020 is not limited to have the hardware configuration shown in FIG. 11, and may have a different configuration.

Further, based on the procedure described in this embodiment, an LSI designing method according to this invention can be implemented.

REFERENCE SIGNS LIST

000 LSI designing platform
011 selector library
012 macro library
020 system LSI building apparatus
021 selector module generating section
022 macro module generating section
023 LSI top connection description generating section
030 netlist
040 IP connection information
050 macro connection information
100 IP library
101 IP information
200 address map information
300 CPU bus IF information

The invention claimed is:

1. An LSIC (Large Scale Integrated Circuit) designing apparatus comprising:
circuitry configured to:
input input/output flow information describing input/output flows of signals between function blocks included in an LSIC to be designed, wherein the input/output flows of signals are described in a format of a relational expression indicating a connection of the signals between the function blocks;
analyze the inputted input/output flow information;
correlate two or more function blocks described in the input/output flow information which output signals of a same type, to one function block that inputs the signals;
generate a selector module of a selector that matches the input/output flows of signals between the correlated function blocks;
generate a control register for the generated selector module;
input CPU (Central Processing Unit) bus interface information;
generate a CPU bus interface based on the inputted CPU bus interface information;
generate a macro module including the selector module and a function block connected to outputs of the selector module, for accessing the control register for the selector module via the CPU bus interface; and
generate input/output flow information describing the input/output flow of a signal between the macro module and a function block connecting the signal to the macro module, based on the input/output flow information describing input/output flows of signals between the function blocks.

2. The LSIC designing apparatus of claim 1, wherein the circuitry is further configured to:
input the input/output flow information describing the input/output flows of signals of different types between function blocks;
analyze the input/output flow information and correlate two or more function blocks that input/output signals of the same type; and
generate the selector module of the selector having an input pin for each of the correlated two or more function blocks that output signals, and an output pin for each of the correlated two or more function blocks that input signals.

3. The LSIC designing apparatus of claim 1, wherein the circuitry is further configured to input the input/output flow information describing the input/output flows of signals between function blocks which include IPs (Intellectual Properties).

4. The LSIC designing apparatus of claim 1, wherein the circuitry is further configured to:
input the input/output flow information describing the input/output flows of signals of different types between function blocks;
analyze the input/output flow information, and generate a plurality of selector modules, each corresponding to a different selector;
analyze the input/output flow information, and correlate two or more function blocks that input/output signals of the same type;
select the selector module of the selector that matches the input/output flows of signals between the correlated two or more function blocks, from among the plurality of selector modules, for each of the types of signals; and
generate the macro module, using the selector module selected for each of the types of signals.

5. An LSIC (Large Scale Integrated Circuit) designing method performed by a computer including circuitry, comprising:
inputting, by the circuitry, input/output flow information describing input/output flows of signals between function blocks included in an LSIC to be designed, wherein the input/output flows of signals are described in a format of a relational expression indicating a connection of the signals between the function blocks;

analyzing, by the circuitry, the inputted input/output flow information;

correlating, by the circuitry, two or more function blocks described in the input/output flow information which output signals of a same type, to one function block that inputs the signals;

generating, by the circuitry, a selector module of a selector that matches the input/output flows of signals between the correlated function blocks;

generating, by the circuitry, a control register for the generated selector module;

inputting, by the circuitry, CPU (Central Processing Unit) bus interface information;

generating, by the circuitry, a CPU bus interface based on the inputted CPU bus interface information;

generating, by the circuitry, a macro module including the selector module and a function block connected to outputs of the selector module, for accessing the control register for the selector module via the CPU bus interface; and generating, by the circuitry, input/output flow information describing the input/output flow of a signal between the macro module and a function block connecting the signal to the macro module, based on the input/output flow information describing input/output flows of signals between the function blocks.

6. A non-transitory computer readable medium including a program recorded thereon, the program configured to perform a method when executed on a computer, the method comprising:

inputting input/output flow information describing input/output flows of signals between function blocks included in an LSIC (Large Scale Integrated Circuit) to be designed, wherein the input/output flows of signals are described in a format of a relational expression indicating a connection of the signals between the function blocks;

analyzing the inputted input/output flow information;

correlating two or more function blocks described in the input/output flow information which output signals of a same type, to one function block that inputs the signals;

generating a selector module of a selector that matches the input/output flows of signals between the correlated function blocks;

generating a control register for the generated selector module;

inputting CPU (Central Processing Unit) bus interface information;

generating a CPU bus interface based on the inputted CPU bus interface information;

generating a macro module including the selector module and a function block connected to outputs of the selector module, for accessing the control register for the selector module via the CPU bus interface; and generating input/output flow information describing the input/output flow of a signal between the macro module and a function block connecting the signal to the macro module, based on the input/output flow information describing input/output flows of signals between the function blocks.

* * * * *